(12) United States Patent
Inoue et al.

(10) Patent No.: US 10,063,114 B2
(45) Date of Patent: Aug. 28, 2018

(54) GENERATOR

(71) Applicant: Kobe Steel, Ltd., Hyogo (JP)

(72) Inventors: Kenichi Inoue, Kobe (JP); Hideo Fujii, Kobe (JP); Hiroyuki Mitani, Kobe (JP); Takehiro Tsuchida, Kobe (JP); Katsura Kajihara, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 369 days.

(21) Appl. No.: 14/899,734

(22) PCT Filed: Mar. 31, 2014

(86) PCT No.: PCT/JP2014/001874
§ 371 (c)(1),
(2) Date: Dec. 18, 2015

(87) PCT Pub. No.: WO2014/203437
PCT Pub. Date: Dec. 24, 2014

(65) Prior Publication Data
US 2016/0141922 A1    May 19, 2016

(30) Foreign Application Priority Data

Jun. 20, 2013  (JP) ................................. 2013-129186

(51) Int. Cl.
*H02K 1/24* (2006.01)
*H02K 19/22* (2006.01)
(Continued)

(52) U.S. Cl.
CPC ............ *H02K 1/243* (2013.01); *H02K 3/528* (2013.01); *H02K 15/022* (2013.01); *H02K 19/22* (2013.01)

(58) Field of Classification Search
CPC ...... H02K 15/022; H02K 1/243; H02K 19/22; H02K 3/528
(Continued)

(56) References Cited

U.S. PATENT DOCUMENTS 2,243,318 A     5/1941  Rawlings
3,226,581 A *  12/1965  Brewster ................ H02K 1/243
                                           310/216.037
(Continued)

FOREIGN PATENT DOCUMENTS

DE      19856526 A1    6/2000
EP      0 957 561 A2  11/1999
(Continued)

OTHER PUBLICATIONS

The extended European search report issued by the European Patent Office dated Jan. 20, 2017, which corresponds to European Patent Application No. 14814610.3-19542 and is related to U.S. Appl. No. 14/599,734; 11pp.
(Continued)

*Primary Examiner* — Alex W Mok
(74) *Attorney, Agent, or Firm* — Studebaker & Brackett PC

(57) ABSTRACT

Provided is a so-called Lundell-type generator capable of avoiding generation of eddy current in rotor iron-cores without complicated structure. The generator includes a stator, a rotary shaft, first and second rotor iron-cores, and a rotor coil. Each rotor iron-core includes a base and rotor magnetic-pole portions extending axially from the base, the rotor coil disposed on the inside thereof. Each rotor iron-core is formed of a plurality of unit plates stacked axially. The unit plates integrally include respective basal plate portions stacked to form the bases and a plurality of magnetic-pole plate portions stacked to form the rotor magnetic-
(Continued)

pole plate portions stacked to form the rotor magnetic-pole portions.

13 Claims, 12 Drawing Sheets

(51) Int. Cl.
*H02K 3/52* (2006.01)
*H02K 15/02* (2006.01)

(58) Field of Classification Search
USPC .............................. 310/216.004, 263, 156.66
See application file for complete search history.

(56) References Cited

U.S. PATENT DOCUMENTS

| | | | |
|---|---|---|---|
| 6,121,709 A | | 9/2000 | Fathimulla et al. |
| 8,471,423 B2* | | 6/2013 | Cartier Millon ..... H02K 21/125 |
| | | | 310/156.02 |
| 2001/0006316 A1* | | 7/2001 | Berger .................... H02K 3/487 |
| | | | 310/420 |
| 2003/0230948 A1* | | 12/2003 | Murakami ............. H02K 1/276 |
| | | | 310/156.53 |
| 2008/0315716 A1* | | 12/2008 | Itoh ...................... H02K 21/044 |
| | | | 310/263 |
| 2011/0043064 A1* | | 2/2011 | Cartier Millon ..... H02K 21/125 |
| | | | 310/156.02 |
| 2011/0133595 A1 | | 6/2011 | Lin |
| 2011/0198964 A1* | | 8/2011 | Biederman ............... B22C 9/04 |
| | | | 310/211 |
| 2012/0169158 A1* | | 7/2012 | Buttner .................... H02K 9/20 |
| | | | 310/54 |
| 2012/0187794 A1 | | 7/2012 | Inoue et al. |
| 2013/0207502 A1* | | 8/2013 | Yamada ............... H02K 1/2713 |
| | | | 310/156.66 |

FOREIGN PATENT DOCUMENTS

| | | |
|---|---|---|
| JP | 2002-315284 A | 10/2002 |
| JP | 2009-038843 A | 2/2009 |
| JP | 2011-120419 A | 6/2011 |
| WO | 2011/040247 A1 | 4/2011 |

OTHER PUBLICATIONS

Translation of International Preliminary Report on Patentability issued in Application No. PCT/JP2014/001874, dated Dec. 30, 215.
International Search Report issued in Application No. PCT/JP2014/001874, dated Jun. 3, 2014.

* cited by examiner

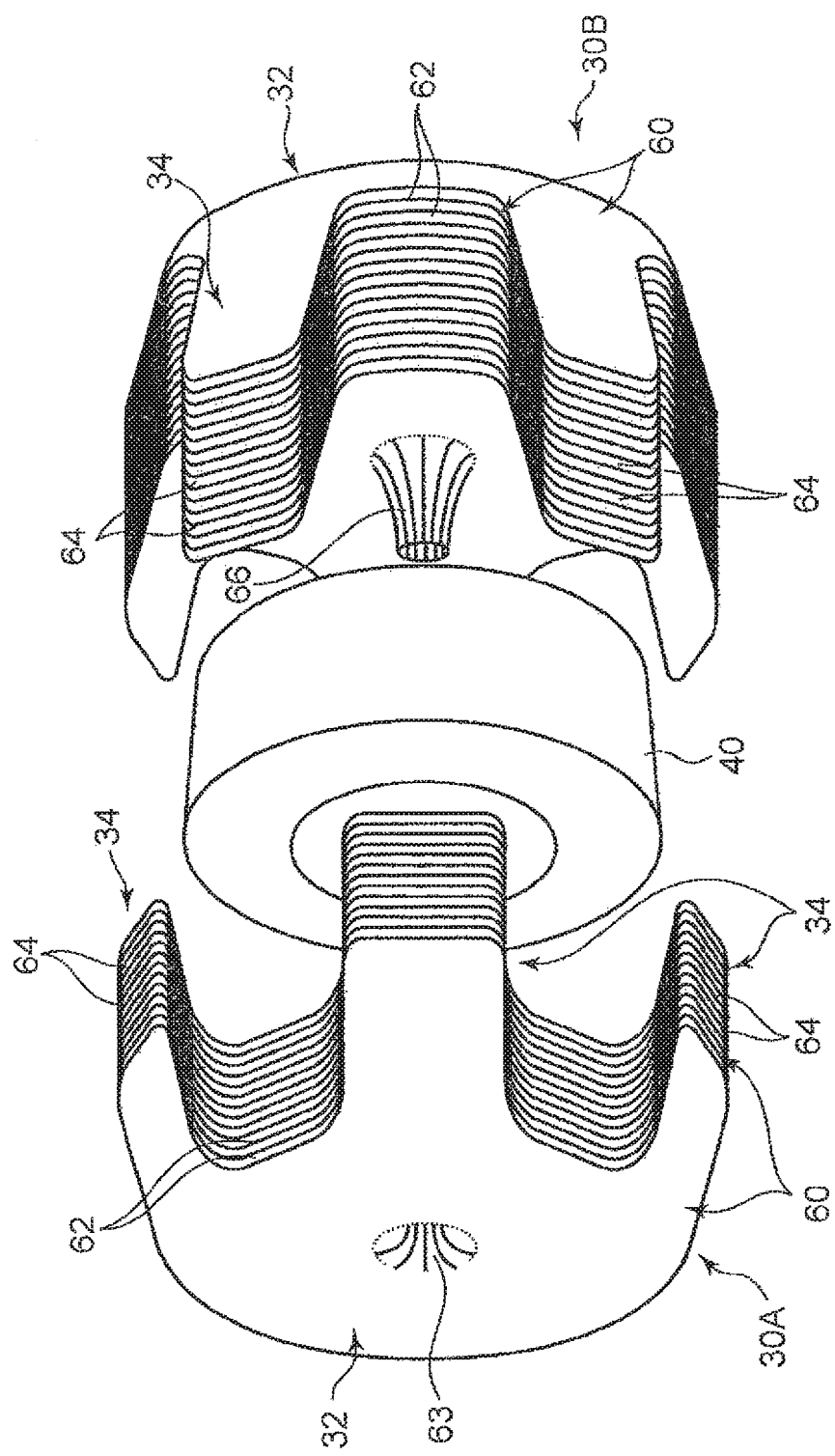

-- PRIOR ART --

GENERATOR

TECHNICAL FIELD

The present invention relates to a Lundell-type generator used in, for example, an alternator of an automobile.

BACKGROUND ART

There has been known a so-called Lundell-type generator as a generator used in, for example, an alternator of an automobile (Patent Literature 1 and 2).

An example of the Lundell-type generator is shown in FIG. 12 and FIG. 13. The shown Lundell-type generator includes: a substantially hollow cylindrical stator 110, a rotary shaft 120 disposed coaxially with the stator 110 on the inner side of the stator 110, first and second rotor iron-cores 121 and 122, a rotor coil (an excitation coil) 124, a front cover 130, and a rear cover 140 which is a hollow cylindrical frame body.

The stator 110 includes magnetic cores 112 and stator coils 114. The magnetic cores 112 are disposed to extend inward from a plurality of positions on the inner surface of the casing 130. The stator coils 114 are wound around the circumference of the magnetic cores 112, respectively. The magnetic cores 112 are usually formed of a large number of non-directional electromagnetic steel plates (or silicon steel plates) mutually and axially stacked. Each of the electromagnetic steel plates has a thickness of 0.5 mm or less.

The rotary shaft 120 is supported, by a bearing fixed to the front cover 130 and the rear cover 140, so as to be coaxial with the stator 110 and relatively rotatable to the stator 110. Each of the rotor iron-cores 121 and 122 is firmly attached onto the outer circumferential surface of the rotary shaft 120 by shrinkage fitting and includes a doughnut-plate-shaped base 126 and a plurality of claw-shaped magnetic poles (called claw poles) 128 projecting from the base 126 along the axial direction. The rotor iron-cores 121 and 122 are disposed so as to orient the magnetic poles 128 thereof in opposite directions to each other and so as to circumferentially arrange the magnetic poles 128 thereof alternately, that is, so as to mesh the magnetic poles 128 thereof with each other in a comb teeth-shape. The rotor coil 124 is disposed between the rotary shaft 120 and the craw-shaped magnetic poles 128 to generate magnetic fluxes in the craw-shaped magnetic poles 128 of the rotor iron-cores 121 and 122 when energized.

The rotor coil 124 is connected to an external power supply 150, through a hollow hole and a side groove provided in the rotary shaft 120 and through a slip ring brush 129 provided at an end portion of the rotary shaft 120 as shown in FIG. 14, to receive supply of an excitation current from the power supply 150. The rotor coil 124, thereby, excites the craw-shaped magnetic poles 128 of both the rotor iron-cores 121 and 122 disposed in the comb teeth-shape each other to an N pole and an S pole alternately. The craw-shaped magnetic poles 128 thus energized rotate to change the N pole and the S pole alternately, thereby vary a line of magnetic flux piercing through the inner side of the stator coils 114 changes in an alternating current manner; this generates a potential difference in a conductor forming the stator coil 114 to supply an electric current to a load connected to the outside. This is the principle of the Lundell-type alternating-current generator.

The comb teeth-like rotor magnetic poles 128 of the Lundell-type generator are often used mainly in a generator for an engine automobile, since the field magnetomotive force is adjustable by the excitation of the rotor coil 124 disposed inside the comb teeth-like rotor magnetic poles 128, which allows magnetic flux adjustment in accordance with rotational speed and a rotational output to be easily performed. In such a small generator, the comb teeth-like (craw-shaped) magnetic poles (claw poles) 128 are usually formed integrally with the base 126 as a single member molded from a magnetic metal lump by forging (or by cutting, in the case of special and few production). In short, the rotor iron-cores 121 and 122 are usually formed of a bulk magnetic iron lump (see Patent Literature 2).

The conventional Lundell-type generator including the lump-like rotor iron-cores 121 and 122, involving a large energy loss due to generation of an eddy current depending on a form of use of the Lundell-type generator, has a problem that the range of uses thereof is extremely limited. For example, if the conventional Lundell-type generator shown in FIG. 12 and FIG. 13 was applied to fields of products where a high output and high efficiency are required such as a large generator, a hybrid car, and an electric vehicle, there could be flowed considerably large alternating current containing harmonics in the stator coils 114; this would permit diamagnetic-field-flux-lines generated by the stator coils 114 to intrude into the lump-like magnetic poles 128 of the rotor iron-cores 121 and 122 to produce eddy current in the surfaces and under the surface skins of the magnetic poles 128, thereby causing conspicuous energy loss.

Besides, in recent years, concerning a small vehicle as well, there is an increasing demand for an ecological vehicle with small size and weight and with high fuel efficiency, so called μ-HV, and it is examined, for the reduction in weight, to make temporary use of an alternator exclusive for power generation also as a starter motor and a regenerative brake; however, also in the case of applying the Lundell-type generator shown in FIG. 12 and FIG. 13 to the alternator, flowing an alternating current or a pulse current into the stator coil 114 from the outside would permit an alternating-current flux lines to intrude into the magnetic poles 128 of the rotor iron-cores 121 and 122. The magnetic lump, such as commercial pure iron, which configures the magnetic poles 128 has not only high magnetic permeability but also high electric conductivity, permitting eddy current to be generated inside the magnetic poles 128 to thereby cause a large (heat) loss and to markedly deteriorate efficiency.

As means for suppressing the generation of the eddy current, known is forming rotor magnetic poles of a stacked body formed by a large number of electromagnetic steel plates; however, it is difficult to directly apply the conventional stacked structure formed by the electromagnetic steel plates and the like to the rotor magnetic poles, since the plurality of rotor magnetic poles forming the Lundell-type generator are integrally joined with the base of the common rotor iron-core to have a complicated shape (so-called claw poles) projecting in a comb teeth shape from the base along the axial direction. Regarding this point, Patent Literature 1 discloses dividing a rotor magnetic pole into a plurality of components and forming the respective components of stacked structures of plane electromagnetic steel plates; however, such a structure is extremely complicated and includes a large number of components, for example, respective bolts for fastening the respective magnetic poles, and assembly thereof is also difficult. Moreover, it is impossible to avoid deterioration in effective magnetic resistance involved by air gaps caused between respective joining surfaces of the electromagnetic steel plates stacked mutually or use of a nonmagnetic insertion object such as a fastening tool. The structure is, thus, poor in practicality.

CITATION LIST

Patent Literature

Patent Literature 1: WO 2011/040247
Patent Literature 2: Japanese Unexamined Patent Publication No. 2011-120419

SUMMARY OF INVENTION

It is an object of the present invention to provide a so-called Lundell-type generator capable of avoiding generation of an eddy current in rotor iron-cores with no complicated structure.

A generator provided by the present invention includes: a stator including a plurality of stator iron-cores including respective stator magnetic poles and arrayed circumferentially to surround a space inside thereof and a stator coil wound around each of the stator iron-cores; a rotary shaft disposed on the inner side of the stator so as to be rotatable relatively to the stator and including a magnetic outer periphery portion made of magnetic material in at least an axial part of a region of the rotary shaft; a first rotor iron-core and a second rotor iron-core disposed around the magnetic outer periphery portion so as to rotate together with the rotary shaft on the inner side of the stator, each of the rotor iron-cores including a base disposed around the magnetic outer periphery portion and a plurality of rotor magnetic-pole portions extending in an axial direction of the rotary shaft from a plurality of positions arrayed circumferentially of the base in an outer periphery of the base and opposed to the stator magnetic poles to be able to be magnetically coupled to the stator magnetic poles, the rotor magnetic-pole portions of the first rotor iron-core and the rotor magnetic-pole portions of the second rotor iron-core being disposed so as to be alternately array in a rotationally circumferential direction; and a rotor coil provided radially inner side of the rotor magnetic-pole portions of the first and second rotor iron-cores to generate magnetic fluxes in the rotor iron-cores and the stator iron-cores. Each of the first and second rotor iron-cores is formed of a plurality of unit plates stacked axially of the rotary shaft in a state in which the unit plates are electrically insulated from each other. Each of the unit plates is formed of a single thin plate made of magnetic material and includes a basal plate portion having a throughhole in a center thereof and disposed around the magnetic outer periphery portion of the rotary shaft in a state where the rotary shaft is inserted through the through-hole and a plurality of magnetic-pole plate portions extending axially of the rotary shaft from a plurality of positions arranged circumferentially of the basal plate portion, the plurality of magnetic-pole plate portions slanting radially outward. The basal plate portions are stacked axially and thereby form the respective bases of the first and second rotor iron-cores. The magnetic-pole plate portions are stacked axially to form the respective rotor magnetic-pole portions of the first and second rotor iron-cores.

BRIEF DESCRIPTION OF DRAWINGS

FIG. 3 is a perspective view showing first and second rotor iron-cores and a rotor coil of the Lundell-type generator.

DESCRIPTION OF EMBODIMENTS

There is explained a first embodiment of the present invention with reference to FIG. 1 to FIG. 8. Although here is explained a generator suitable for a Lundell-type alternator that is usable also as an electric motor, the generator according to the present invention is not limited to this but permitted to be broadly applied to, for example, a generator used exclusively for power generation and a generator also used in a regenerative brake.

Figure 1:
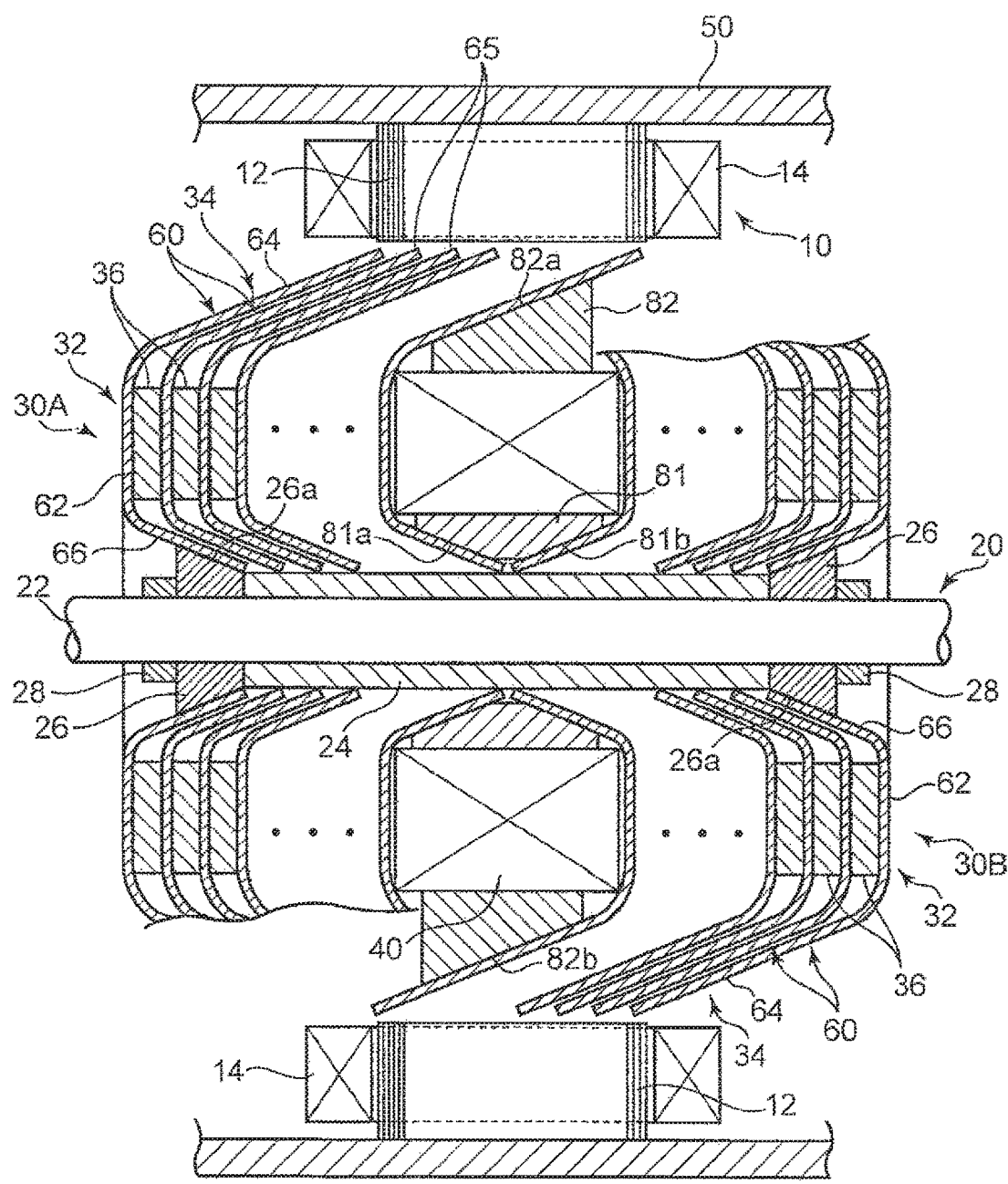
FIG. 1 is a sectional front view showing a main part of a Lundell-type generator according to a first embodiment of the present invention.
Figure 2:
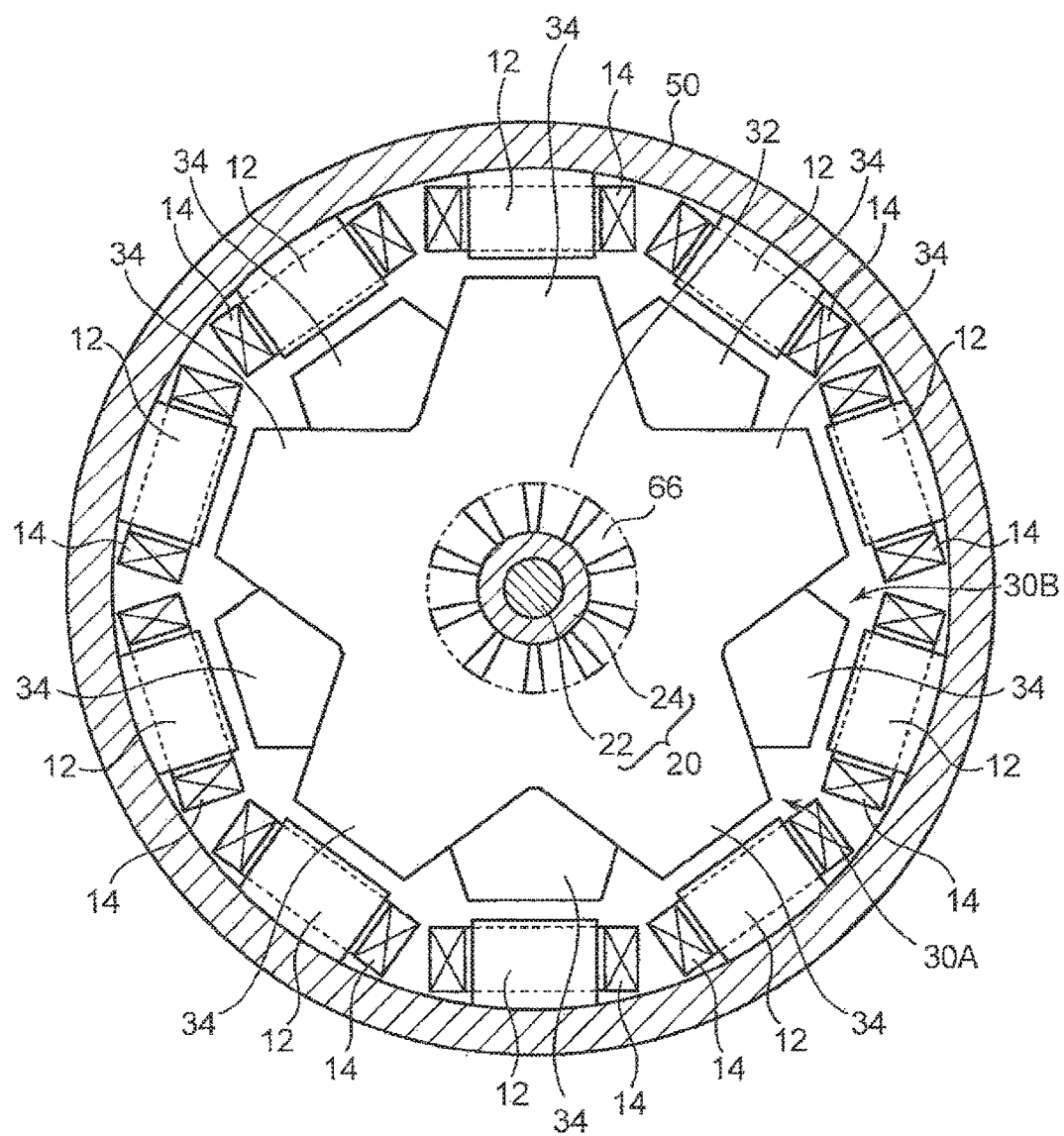
FIG. 2 is a partial sectional front view showing the main part of the Lundell-type generator.

FIG. 1 and FIG. 2 show a Lundell-type generator according to the first embodiment. The generator includes, as main components thereof, a stator 10, a rotary shaft 20, first and second rotor iron-cores 30A and 30B, a rotor coil 40, and a hollow cylindrical casing 50 that houses these components collectively.

The stator 10 has a plurality of stator iron-cores (stator cores) 12 including respective stator magnetic poles and a stator coil 14 wound around each of the stator iron-cores 12. Each of the stator iron-cores 12 is formed of, for example, a large number of electromagnetic steel plates stacked mutually and axially of the generator (in a direction parallel to a rotary shaft 20 explained below) and the stator iron-cores 12 are disposed on the inner circumferential surface of the casing 50 so as to be arrayed circumferentially to surround a space on the inner side of the stator iron-cores 12.

The rotary shaft 20, which is disposed on the inner side of the stator 10 so as to be rotatable relatively to the stator 10, includes a main shaft 22 and a magnetic cylinder body 24. The main shaft 22 includes not-graphically-shown opposite end portions. Each of the end portions is supported rotatably (so as to be rotatable relatively to the stator 10) by a bearing provided in the casing 50 or in a cover fixed to the casing 50. The magnetic cylinder body 24, which is made of magnetic material capable of forming a necessary magnetic circuit, is fit and fixed on the outer side of the main shaft 22 in at least an axial part of a region of the main shaft 22 (in this embodiment, a region except both the end portions of the main shaft 22). The magnetic cylinder body 24, thus, forms a magnetic outer periphery portion of the rotary shaft 20. In this embodiment, on both the outer sides of the magnetic cylinder body 24, respective pressing jigs 26 and respective fixing nuts 28 are disposed. The fixing nuts 28 are screwed with not-graphically-shown respective male screws formed in the main shaft 22 and tightened toward the center to thereby clamp the magnetic cylinder body 24 axially via the pressing jigs 26 at both the axially outer sides.

The rotary shaft according to the present invention only has to include the magnetic outer periphery portion in an appropriate axial region thereof; the rotary shaft is, therefore, not limited to one including the magnetic cylinder body 24 explained above. For example, in the case of no requirement for high strength of the rotary shaft, the rotary shaft may be entirely made of magnetic material, or a magnetic coating forming the magnetic outer periphery portion may be applied to the surface of the main shaft.

The first and second rotor iron-cores 30A and 30B are disposed around the magnetic cylinder body 24 so as to rotate together with the rotary shaft 20 on the inner side of the stator 10. Each of the rotor iron-cores 30A and 30B includes a base 32 and a plurality of rotor magnetic-pole portions 34. The base 32 is disposed around the magnetic cylinder body 24. The rotor magnetic-pole portions 34 extend along the axial direction of the rotary shaft 20 from a plurality of positions arranged circumferentially of the bases 32 in the outer periphery of each of the bases 32. The rotor magnetic-pole portions 34 are opposed to the stator magnetic poles at radially inner side thereof to be capable of being magnetically coupled to the stator magnetic poles of the stator 10.

The rotor iron-cores 30A and 30B are disposed such that the rotor magnetic-pole portions 34 of the first rotor iron-core 30A and the rotor magnetic-pole portions 34 of the second rotor iron-core 30B are alternately arrayed in the rotationally circumferential direction. In other words, the rotor iron-cores 30A and 30B are disposed along the rotary shaft 20 in such an opposition disposition that the comb-teeth-shaped magnetic-pole portions 34 of the rotor iron-cores 30A and 30B mesh with each other.

The rotor coil (an excitation coil) 40 is axially interposed between the rotor iron-cores 30A and 30B and provided to be located on the radially inner side of the rotor magnetic-pole portions 34 of the rotor iron-cores 30A and 30B. The rotor coil 40 generates magnetic fluxes in respective interiors of the rotor iron-cores 30A and 30B and the stator iron-cores, by receiving supply of an electric current. Specifically, the rotor coil 40 forms a magnetic circuit circulating through the N pole→the stator iron-cores→the S pole→the magnetic cylinder body 24 in this order, wherein each of the rotor magnetic-pole portions 34 of one of the rotor iron-cores 30A and 30B serves as an N pole and each of the rotor magnetic-pole portions 34 of the other serves as an S pole. The relative rotation of the rotor magnetic-pole portions 34 in which the N poles and the S poles are thus alternately excited in an array direction (i.e., the circumferential direction) of the rotor magnetic-pole portions 34 to the stator 10 imparts an electromotive force to the stator coil 14 of the stator 10.

Figure 4A:
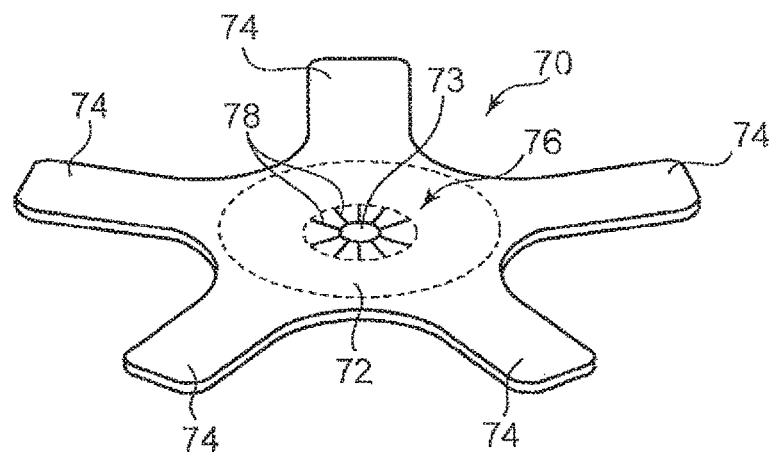
FIG. 4A is a perspective view showing an original plate for forming unit plates configuring the rotor iron-cores.
Figure 4B:
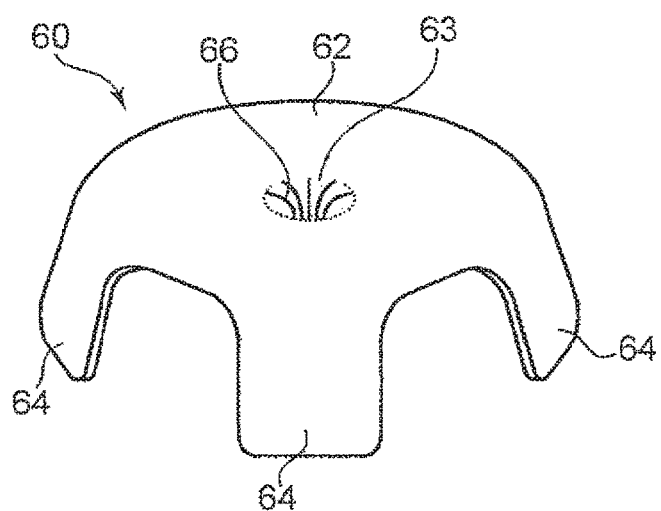
FIG. 4B is a perspective view of the unit plate viewed from a base side.
Figure 4C:
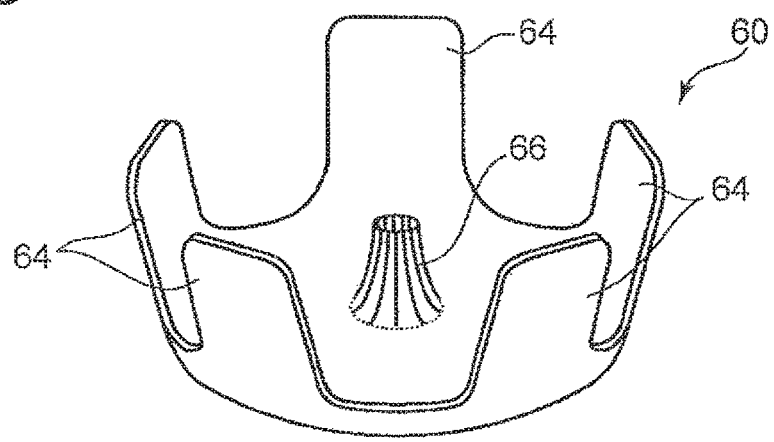
FIG. 4C is a perspective view of the unit plate viewed from a rotor magnetic-pole portions side.

As the feature of the generator, also as shown in FIG. 31, each of the rotor iron-cores 30A and 30B is formed of a plurality of unit plates 60 stacked mutually and axially of the rotary shaft 20. Each of the unit plates 60 is made of magnetic material and, as shown in FIG. 4A to FIG. 4C, formed of a single thin plate. The unit plates 60 can have the same shapes as each other, which allows production efficiency of the rotor iron-cores 30A and 30B to be remarkably improved.

Basal plate portions 62 of the unit plates 60 has a doughnut-plate shape including a through-hole 63 in the center, disposed around the magnetic cylinder body 24 which is the magnetic outer periphery portion of the rotary shaft 20, in a state where the rotary shaft 20 is inserted through the through hole 63. The magnetic-pole plate portions 64 extend axially of the rotary shaft 20 from a plurality of positions arranged circumferentially of the basal plate portions 62 in the outer periphery of the basal plate portions 62, while slanting radially outward. The outward slant angle of the magnetic-pole plate portions 64 is sufficient if allowing the magnetic-pole plate portions 64 to be stacked mutually and axially as shown in FIG. 1, the specific value of the angle being permitted to be freely set according to specifications.

The basal plate portions 62 are stacked axially while being electrically insulated from each other to thereby form respective bases 32 of the first and second rotor iron-cores 30A and 30B. The magnetic-pole plate portions 64 are stacked axially while being electrically insulated from each other to thereby form respective rotor magnetic-pole portions 34 of the first and second rotor iron-cores 30A and 30B. The unit plates 60 forming the rotor iron-cores 30A and 30B can be integrated with each other by, for example, impregnation of appropriate resin. Desirably, at least one of both side surfaces and an end face of each of the unit plates 60 are subject to insulating coating.

FIG. 1 and FIG. 3 show the enlarged thickness of the unit plates 60 compared to the actual thickness for convenience, while, as explained below, the actual thickness of the unit plates 60 is extremely small. The rotor iron-cores 30A and 30B are, therefore, formed of the unit plates 60 in a number (e.g., twenty to several tens) larger than the number shown in the figures.

Specifically, it is preferable that the thickness of the unit plates 60 is a value equal to or less than the skin depth value corresponding to the magnetic frequency f and the material quality (conductivity and magnetic permeability) of the rotor iron-cores, the magnetic frequency being obtained by multiplying a rotation frequency (a rated rotation frequency) of the generator with the number of the rotor magnetic-pole portions 34 of the rotor iron-cores 30A and 30B (the number being five in an example shown in FIG. 2, FIG. 3, and FIG. 4A to FIG. 4C), and equal to or larger than the skin depth value corresponding to a frequency ten times higher than the magnetic pole frequency. Skin depth $\delta$ (m), which is a depth of intrusion of an electromagnetic wave from a sample surface to approximately 1/e, is given by the following expression, wherein resistivity is represented as $\rho$ ($\Omega$/m) and magnetic permeability is represented as $\mu$(H/m).

$\delta=[\rho/(\pi \cdot f \cdot \mu)]1/2$

Figure 5:
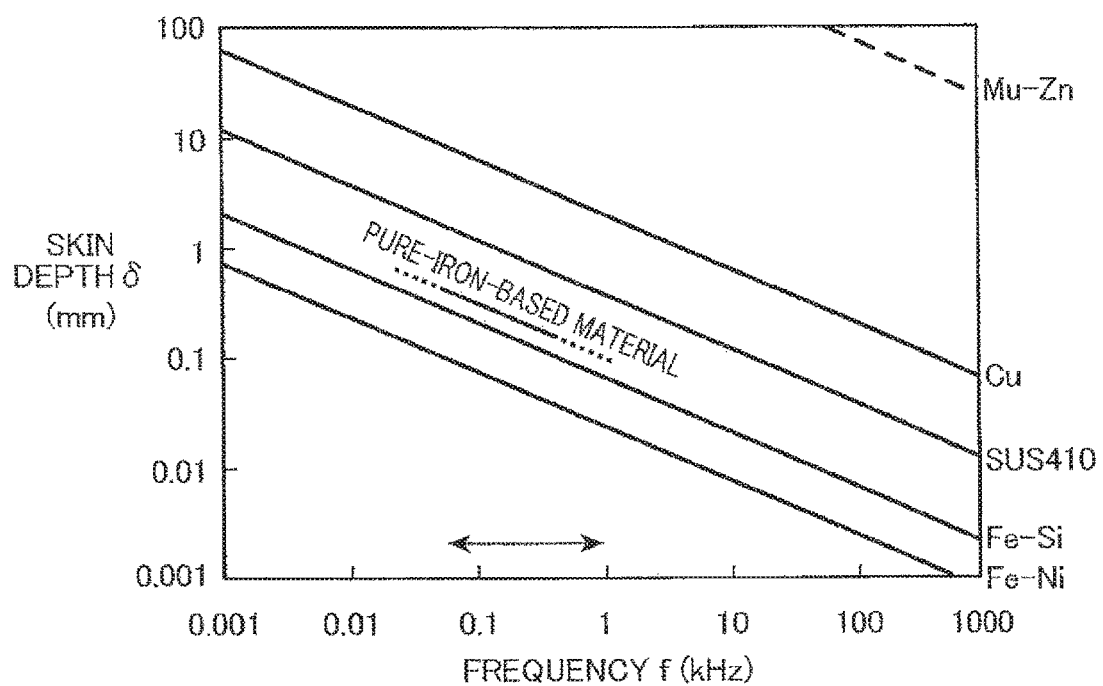
FIG. 5 is a graph showing a relation between rotation frequencies of various materials and skin depth.

Based on this relationship, the relation between the frequency f (kHz) and the skin depth δ (mm) with respect to various materials is unconditionally determined as shown in FIG. 5. Therefore, the skin depth δ corresponding to the frequency f and suitable thickness of the unit plates 60 can be determined from this relation.

For example, if the band of the driving frequency (in general, a rated frequency) of the generator is 50 Hz≤f≤kHz including harmonics and the unit plates 60 are made of pure-iron-based material, it is desirable to set the thickness t of each of the unit plates 60 in a range of 0.1 mm≤t≤0.5 mm. Specifically, the upper limit is desirably set to approximately 500 μm, more desirably, 300 μm or less for easiness of machining, and, more desirably, 100 μm or less. Meanwhile, there is a limit in thickness accuracy by rolling; the thickness is, hence, realistically set to 30 μm or more. The stack of the unit plates 60 each having such a small thickness makes it possible to effectively restrain eddy current from being generated.

Respective distal ends 65 of the magnetic-pole plate portions 64 of the unit plates 60 are arranged so as to be arrayed along an inner surface of the stator magnetic pole of the stator 10, namely, a stator magnetic pole surface, involved by the axial stack of the unit plates 60, thus being capable of forming a rotor magnetic pole surface opposed to the stator magnetic pole surface. The rotor magnetic pole surface effectively restrains an eddy current from being generated, while permitting the magnetic flux to make smooth entrance from the stator magnetic pole surface.

On the other hand, a given part of each of the basal plate portions 62 of the unit plates 60, the given part surrounding each of the through-hole 63, forms an inner periphery portions 66 extending in the same direction as the magnetic-pole plate portions 64 while slanting radially inward. The inner periphery portions 66 are also stacked mutually and axially. The stack of the inner periphery portions 66 increases the stability of the stacking state of the unit plates 60. Besides, the slant of each of the inner periphery portions 66 can increase an opposition area of the periphery portions and the rotary shaft compared with, for example, the case where the periphery portion is orthogonal to the rotary shaft, thereby decreasing magnetic resistance.

Figure 6A:
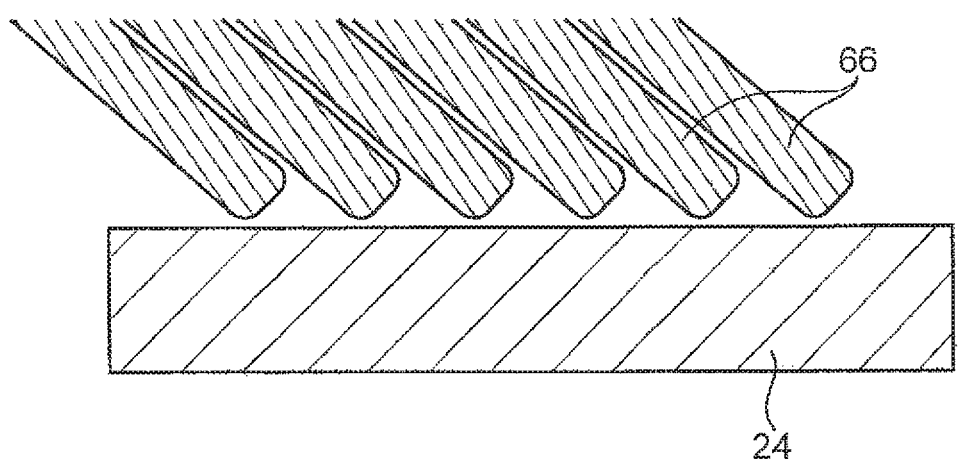
FIG. 6A is a sectional view showing an example of a relation between inner side ends of taper periphery portions of the unit plates and an outer circumferential surface of a magnetic cylinder of a rotary shaft.
Figure 6B:
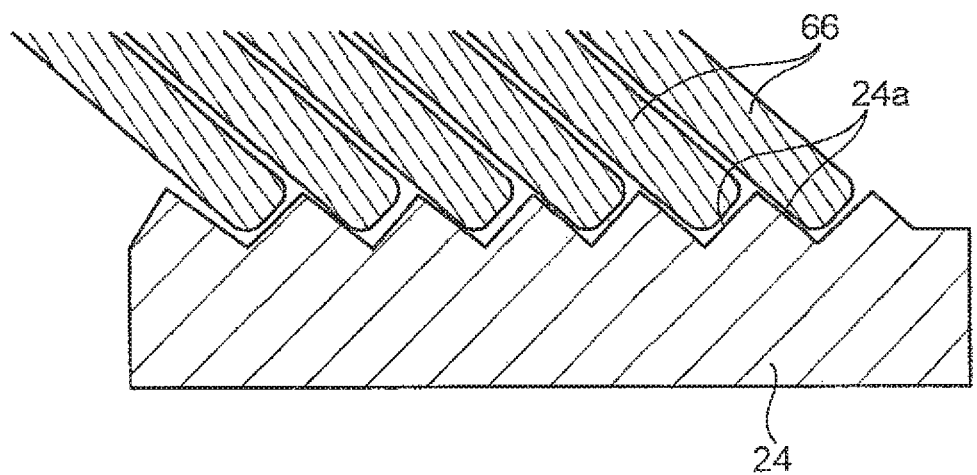
FIG. 6B is a sectional view showing an example of a relation between the inner side ends of the taper periphery portions of the unit plates and the outer circumferential surface of the magnetic cylinder of the rotary shaft.

Furthermore, in this case, it is possible to set the diameter of the end of each of the inner periphery portions 66 such that the rotary shaft 20 is press-fit to the inner sides of the inner periphery portions 66, that is, the end of each of the inner periphery portions 66 makes close contact with the outer circumferential surface of the magnetic cylinder body 24 as the magnetic outer periphery portion of the rotary shaft 20. The close contact allows the magnetic resistance to be further reduced and stabilizes respective relative positions of the first and second rotor iron-cores to the rotary shaft. Herein, the "close contact" is not required to be strict; for example, even if there actually exist gaps between the distal ends of the inner periphery portions 66 and the outer circumferential surface of the magnetic cylinder body 24 as shown in FIG. 6A, the magnetic resistance can be reduced if the gaps are minute. Furthermore, providing step sections 24a to the outer circumferential surface of the magnetic cylinder body 24 in accordance with the array of the inner periphery portions 66 as shown in FIG. 6B allows the magnetic resistance to be further reduced.

On the other hand, the pressing jigs 26 have respective outer circumferential surfaces 26a tapered corresponding to the inner periphery portions 66. This enables the pressing jigs 26 to constrain the rotor iron-cores 30A and 30B at axial both outer sides thereof.

In this generator (the so-called Lundell-type generator), forming the first and second rotor iron-cores 30A and 30B by the plurality of unit plates 60 mutually and axially stacked makes it possible to effectively restrain eddy current from being generated in the rotor iron-cores 30A and 30B and, further, to easily construct the rotor iron-cores 30A and 30B having an excellent eddy current prevention characteristic without requiring complicated fastening structure or a large number of components for assembly.

The generator can be efficiently manufactured, for example, according to the below explained procedure.

1) Forming the Unit Plates 60

Each of the unit plates 60 can be easily formed by preparing a single flat original plate made of magnetic material and including the basal plate portions 62 and the magnetic-pole plate portions 64, and by bending (e.g., press-forging) the original plate.

For example, the original plate 70 shown in FIG. 4A integrally includes a center circular portion 72 equivalent to the basal plate portion 62 and a plurality of petal-shaped portions 74 which are portions equivalent to the magnetic-pole plate portions 64 and extend radially from the portion 62'. The circular portion 72 is formed with a circular through-hole 73 in the center thereof. The circular portion 72 includes a periphery portion 76 around the through-hole 73, the periphery portion 76 being circumferentially divided by respective radial slits 78. The original plate 70 can be easily punched out from a normal plate member. By press-forging the original plate 70 so as to bend the petal-like portions 74 and the divided through-hole periphery portion 76 to the same side, the unit plate 60 having a cup shape shown in FIG. 4B and FIG. 4C can be formed. In the unit plate 60, the circular portion 72, the petal-like portions 74, and the divided periphery portion 76 serve as the basal plate portion 62, the magnetic-pole plate portions 64, and the inner periphery portions 66, respectively.

For the material of the unit plates 60, desirably used is material that can be inexpensively acquired compared with an electromagnetic steel plate while having excellent magnetic characteristics (saturation magnetic flux density and magnetic permeability) and forging workability, that is, industrially advantageous material. In general, suitable is pure-iron-based material, specifically, pure-iron-based alloy having respective impurity concentrations of impurity elements C, P, and S harmful for magnetic characteristic as follows: carbon (C) is 300 ppm or less; phosphorus (P) is 300 ppm or less; and sulfur (S) is 300 ppm or less, wherein at least one of both side surfaces and a cut end face thereof are coated with an insulating coating. Furthermore, C is desirably 200 ppm or less and more desirably 100 ppm or less; P is desirably 200 ppm or less and more desirably 150 ppm or less. An element Al effective for deoxidation in a steel manufacturing process, being an element effective for fixing of N and necessary for controlling a form of an inclusion, is inevitable to be contained in the element Al; however, it is desirable that the amount thereof the element Al is 0.03% or less (not including 0%). Besides, allowable components described below can be added in a range in which the action of the present invention is not spoiled. On the other hand, each of elements such as Ca, REM (=lanthanoid elements (fifteen elements of La to Ln)), Mg, Li, Pb, and Bi has an effect of spherodizing a sulfur (S)-compound-based inclusion or the like and reducing deterioration in cold workability, punching workability, machinability, and a fatigue-resistance characteristic.

The total amount of the impurity elements is desirably 0.05% or less (not including 0%). Also each of the elements Cr, Cu, Sn, Ni, Mo, Nb, V, B, and N is an element having action of improving deformability of steel while deteriorating the magnetic characteristics; it is, therefore, desirable that the total amount of the impurity elements is not 0.05% or less.

Regarding the magnetic characteristics, the material is desirably pure iron or an iron alloy whose magnetic flux density in an excitation magnetic field of 10000 A/m is 1.5 T or more. As an example, desirable component compositions (excluding an insulating coating) are illustrated below.

A. Respective concentrations of C, P, S, and Al, which are impurity elements harmful for the magnetic characteristics, are as follows: C: 0.03% or less; P: 0.03% or less; S: 0.03%; and Al: 0.03% or less. The remainder consists of iron and inevitable impurities.

B. Respective concentrations of C, P, S, and Al, which are the impurity elements harmful for the magnetic characteristics, are as follows: C: 0.03% or less; P: 0.03% or less; S: 0.03%; and Al: 0.03% or less. Concentration of Mn is 0.10 to 0.50, and the remainder consists of iron and inevitable impurities.

C. Respective concentrations of C, P, S, and Al, which are the impurity elements harmful for the magnetic characteristics, are as follows: C: 0.03% or less; P: 0.03% or less; S: 0.03%; and Al: 0.03% or less. Concentration of Mn is 0.10 to 0.50%, concentration of Si is 0.05 to 2.0%, and the remainder has a component composition consisting of iron and inevitable impurities.

Furthermore, the thin plate member used in the unit plates 60, if manufactured by cold rolling, cannot have desired magnetic characteristics itself; therefore, it is desirable in this case to perform so-called magnetic annealing for heating the thin plate member to temperature (in general 850° C. or more) at which the magnetic characteristics can be recovered. The magnetic annealing grows crystal grains to thereby improve the magnetic characteristics such as saturation magnetic flux density. Regarding the size of the crystal grains, the average crystal grain diameter thereof is desirably 100 μm or more, which allows excellent magnetic characteristics to be obtained.

2) Stacking the Unit Plates 60

By axial stack of a given number of the unit plates 60, the first and second rotor iron-cores 30A and 30B are constructed, wherein: the basal plate portions 62 of the unit plates 60 are stacked mutually and axially to form the bases 32 of the rotor iron-cores 30A and 30B; and the magnetic-pole plate portions 64 are stacked mutually and axially to form the rotor magnetic-pole portions 34. The inner periphery portions 66 of the unit plates 60 are also stacked mutually and axially to thereby stabilize the stacking state of the entire unit plates 60. The stack causes respective distal ends 65 of the petal-like magnetic-pole plate portions 64 to be arrayed axially to form the rotor magnetic pole surface. The rotor magnetic pole surface is a surface capable of being opposed to a stator magnetic pole surface in an attitude parallel to the stator magnetic pole surface involved by the below-mentioned insertion of the rotor into the casing 50.

The stack of the unit plates 60 brings the magnetic-pole plate portions 64 adjacent to each other and the inner periphery portions 66 adjacent to each other into contact or contiguous with each other, while leaving respective axial gaps between respective specific parts of the basal plate portions 62, the specific parts located radially outward of the inner periphery portions 66. The smaller the radially outward slant angle of the magnetic-pole plate portions 64, the greater the remaining gaps become. In this case, interposing magnetic annular elements 36 made of magnetic material between the basal plate portions 62 to fill the gaps allows magnetic resistance in the rotor iron-cores 30A and 30B to be reduced by effective utilization of the gaps.

It is preferable to perform, upon the complement of the stack as explained above, the integration of the unit plates 60 by impregnation of appropriate resin or the like, that is, forming the rotor iron-cores 30A and 30B. The integration markedly facilitates the next assembly process.

3) Assembly and Insertion of the Rotor

Both the rotor iron-cores 30A and 30B formed as explained above are disposed oppositely to each other via the rotor coil 40 placed therebetween. In this state, the rotary shaft 20 composed of the main shaft 22 and the magnetic cylinder body 24 is inserted through respective center through-holes of the iron-cores 30A and 30B. Both the rotor iron-cores 30A and 30B and the rotor coil 40 are thereby disposed around the rotary shaft 20.

The rotor coil 40 is disposed between the magnetic-pole plate portion 64 and the inner periphery portion 66 of the unit plate 60 on the most inner side among the unit plates 60 forming the rotor iron-cores 30A and 30B. On the other hand, there are desirably interposed an inner spacer 81 and an outer spacer 82 shown in FIG. 1 between the inner side surface of the rotor coil 40 and the inner periphery portion 66 (in other words, between the rotor coil 40 and the rotary shaft 20) and between the outer side surface of the rotor coil 40 and the magnetic-pole plate portion 64, respectively. Each of the spacer 81 and 82 has an annular shape surrounding the rotary shaft 20. The inner spacer 81 has an inner side surface including a first taper surface 81a and a second taper surface 81b which are tapered corresponding to the inner periphery portions 66 of the unit plates 60 forming the rotor iron-cores 30A and 30B, respectively. The outer spacer 82 has an outer circumferential surface including a first taper surface 82a tapered corresponding to the magnetic-pole plate portions 64 of the unit plates 60 of the first rotor iron-cores 30A and a second taper surfaces 82b tapered corresponding to the magnetic-pole plate portions 64 of the unit plates 60 of the second rotor iron-cores 30B, the taper surfaces 82a and 82b being arranged circumferentially and alternately. The spacers 81 and 82 can stabilize the position of the rotor coil 40 and also respective axial positions of both the rotor iron-cores 30A and 30B.

Following the above disposition of both the rotor iron-cores 30A and 30B and the rotor coil 40 around the rotary shaft 20, the pressing jigs 26 are attached to the axial opposite end portions of the main shaft 22, respectively, and the fixing nuts 28 are attached to the part on respective outer sides of the pressing jigs 26. By tightening the fixing nuts 28, the magnetic cylinder body 24 is clamped between both the pressing jigs 26, and the rotor iron-cores 30A and 30B are constrained on both the axial outer sides thereof across the rotor coil 40 and both the spacers 81 and 82 in the center between the rotor iron-cores 30A and 30B.

The entire rotor thus assembled is inserted into the inner side of the stator 10 in the casing 50, whereby the generator is completed.

The present invention is not limited to the embodiment explained above. For example, the magnetic annular elements 36 and/or the spacers 81 and 82 can be omitted as appropriate according to specifications. Appropriate changes and improvements are also possible.

Figure 7:
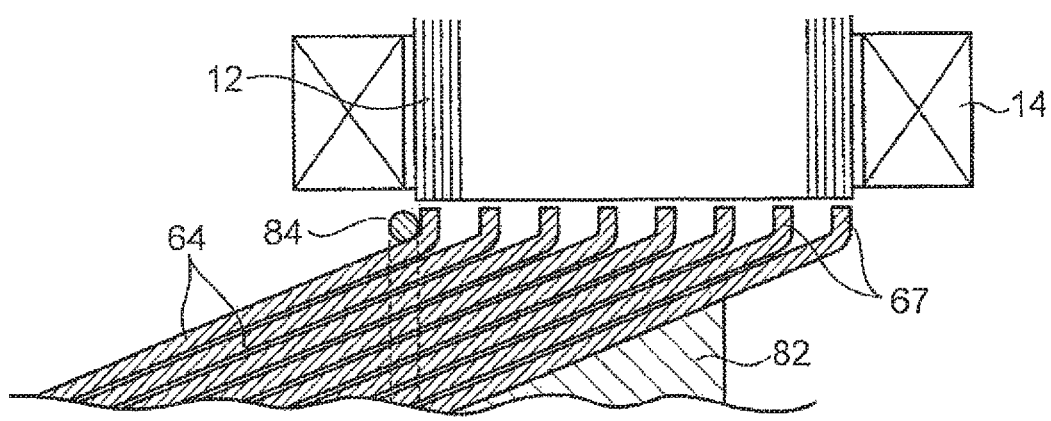
FIG. 7 is a sectional side view showing a modification concerning outer circumferential portions of the rotor magnetic-pole portions.

For example, as shown in FIG. 7, respective distal ends of the magnetic-pole plate portions 64 may be bent to form respective brim-shaped portions 67 projecting radially outward and toward the stator magnetic pole surface. The brim-shaped portions 67 allow magnetic flux lines to smoothly and penetratingly pass through from the rotor magnetic-pole portions 34 to the stator magnet poles, thereby making it possible to improve power generation performance or electromotion performance and to further restrain eddy current.

Figure 8:
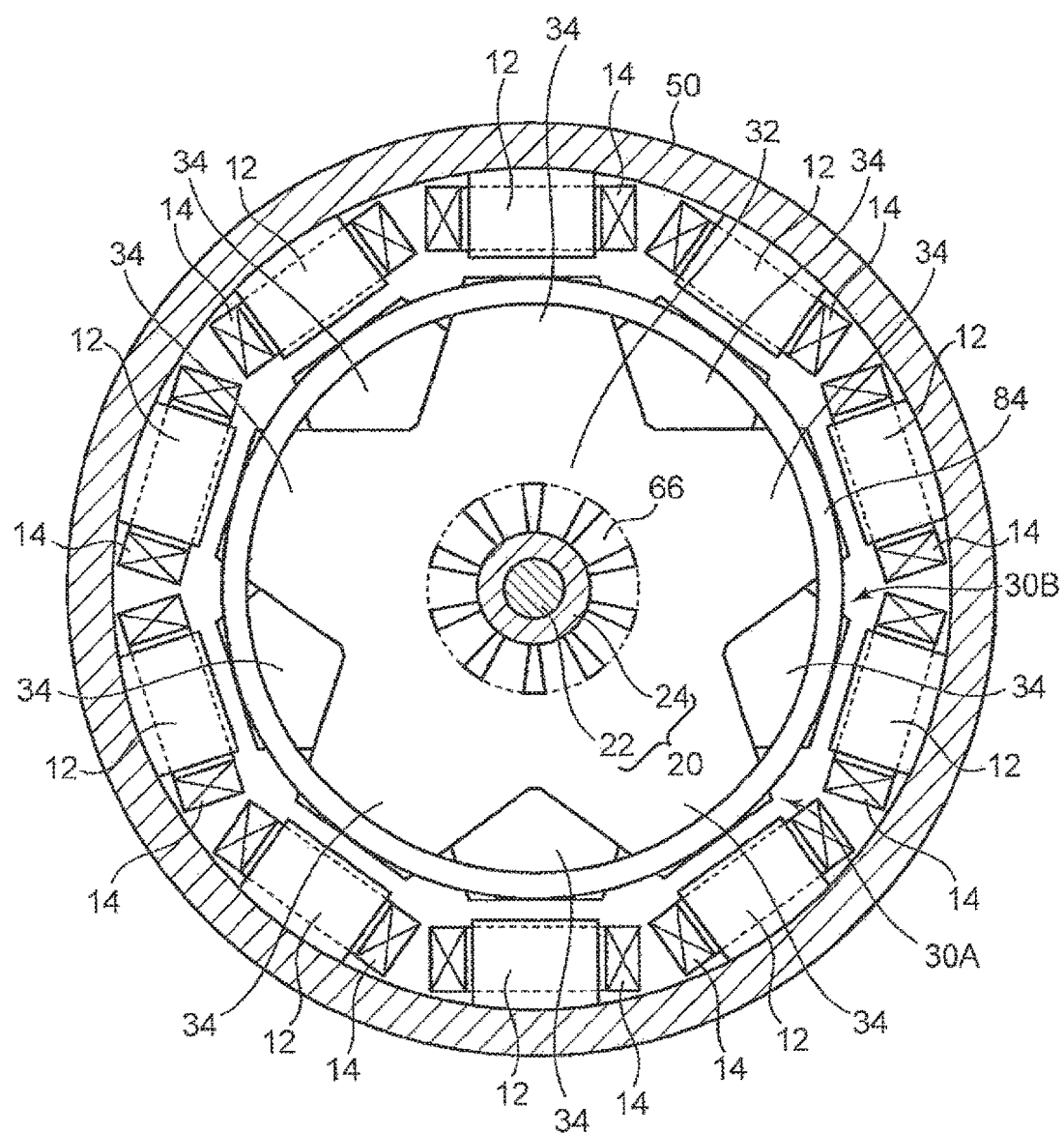
FIG. 8 is a partial sectional front view showing the modification.

Moreover, as shown in FIG. 7 and FIG. 8, it is more desirable to attach an annular constraint member 84 to at least an outer unit plate which is the plate located on the most axially outer side (in FIG. 7, the leftmost side) among the unit plates 60 forming the rotor iron-cores 30A and 30B. The constraint member 84 is made of high-tension material and attached across the magnetic-pole plate portions 64 of the outer unit plates, thereby preventing the magnetic-pole plate portions 64 from spreading radially outward due to centrifugal force. The constraint member 84 is capable of effectively suppressing deformation due to a centrifugal force of the magnetic-pole plate portions, with a simple structure.

Figure 9:
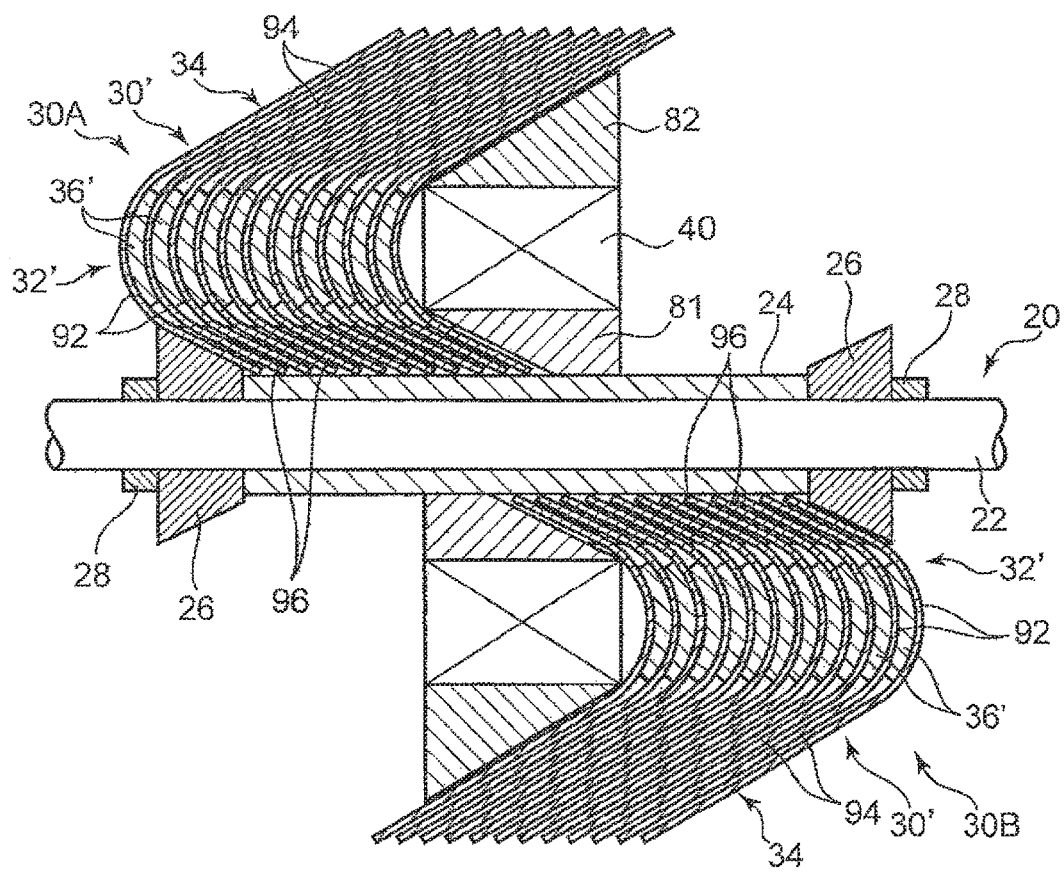
FIG. 9 is a sectional side view showing a main part of a Lundell-type generator according to a second embodiment of the present invention.
Figure 10:
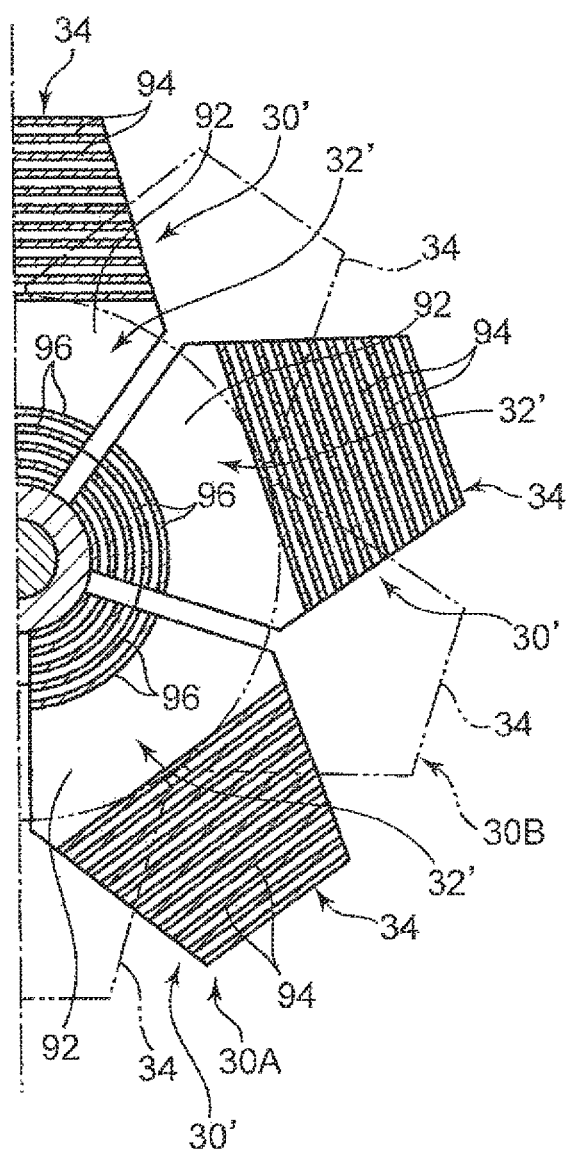
FIG. 10 is a sectional front view showing the main part of the Lundell-type generator according to the second embodiment.

Next will be explained a second embodiment of the present invention with reference to FIG. 9 to FIG. 11.

While each of the rotor iron-cores 30A and 30B according to the first embodiment includes a single base 32 and a plurality of rotor magnetic-pole portions 34 connected to the base 32, each of the rotor iron-cores 30A and 30B according to the second embodiment includes a plurality of divided bases 32' divided circumferentially and a plurality of rotor magnetic-pole portions 34 extending axially from the divided bases 32', respectively. In other words, each of the rotor iron-cores 30A and 30B is formed of a plurality of divided elements 30' divided circumferentially, each of the divided elements 30' is composed of a single divided base 32' and a single rotor magnetic-pole portions 34 joined to the divided bases 32'.

Also in the second embodiment, the divided elements 30' of the rotor iron-cores 30A and 30B can be formed of a plurality of unit plates 90 stacked mutually. Similarly to each of the unit plates 60 according to the first embodiment, each of the unit plates 90 is formed of a single plate member made of magnetic material, integrally including a divided basal plate portion 92 and a magnetic-pole plate portions 94 extending axially and slanting radially outward from outer end portions of the divided basal plate portions 92. Furthermore, desirably, the inner side portion of the divided basal plate portion 92 forms an inner periphery portion 96 axially extending toward the same side as the magnetic-pole plate portions 64 while slanting radially inward.

Figure 11:
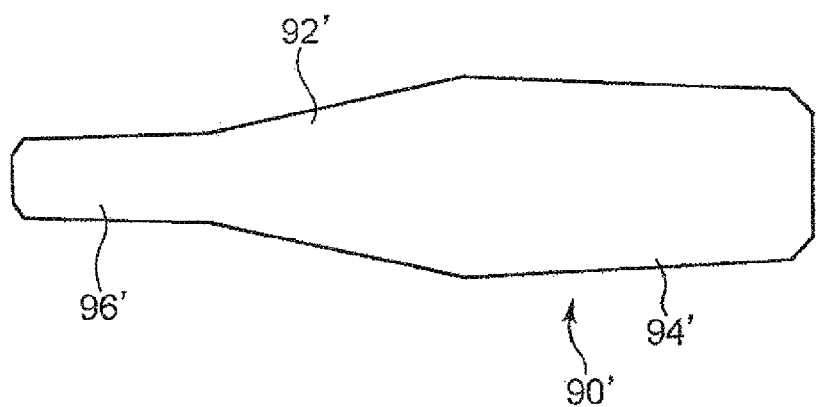
FIG. 11 is a plan view of unit plates configuring first and second rotor iron-cores according to the second embodiment.
Figure 12:
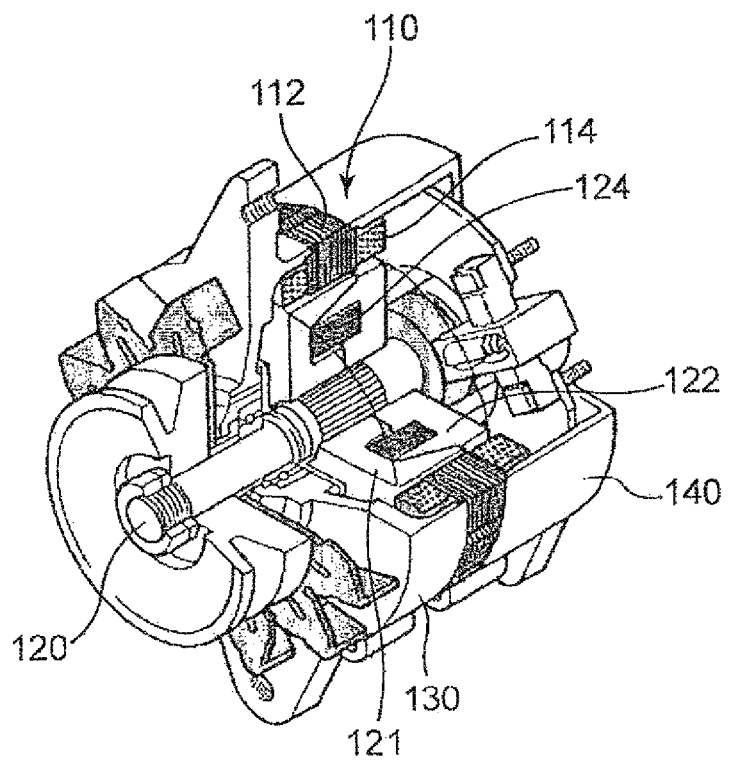
FIG. 12 is a sectional perspective view showing an example of a conventional Lundell-type generator.
Figure 13:
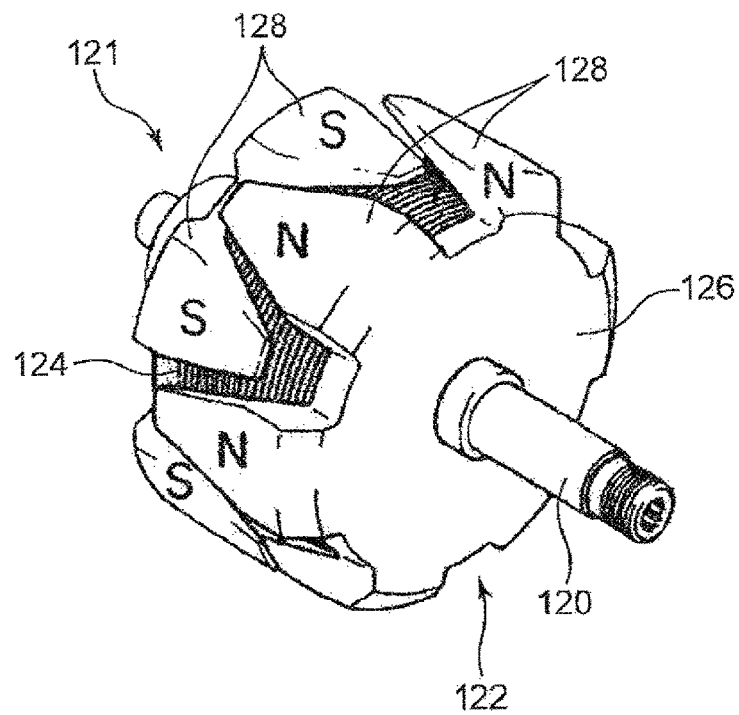
FIG. 13 is a perspective view of a rotating portion of the Lundell-type generator shown in FIG. 12.
Figure 14:
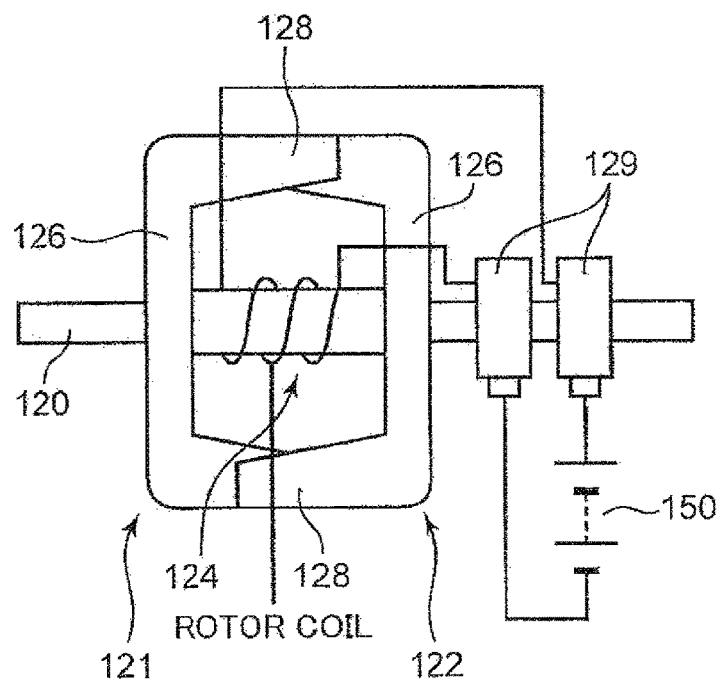
FIG. 14 is a side view showing wiring for a rotor coil of the Lundell-type generator shown in FIG. 12.

Similarly to the unit plate 60, the unit plate 90 can be formed by, for example, bending a flat original plate 90' shown in FIG. 11. The original plate 90' integrally includes a first portion 92' equivalent to the divided basal plate portion 92 and a second portion 94' equivalent to the magnetic-pole plate portion 94, wherein the first portion 92' has an end portion 96' on the side opposite to the second portion 94', the end portion 96' being equivalent to the inner periphery portion 96. Hence, the unit plate 90 can be formed by bending the second portion 94' and the end portion 96' of the original plate 90' with press-forging or the like.

In the unit plates 90, respective divided basal plate portions 92 are stacked mutually and axially to thereby form the divided bases 32' of the divided elements 30', and the magnetic-pole plate portions 94 are stacked mutually to thereby form the rotor magnetic-pole portions 34 of the divided elements 30'. Involved by the stacks, the inner periphery portions 96 are also stacked mutually. The thus stacked unit plates 90 are then integrated by, for example, impregnation of resin, whereby the plurality of divided elements 30' constituting the rotor iron-cores 30A and 30B are formed. Similarly to the first embodiment, the stack desirably involves respective interpositions of divided annular bodies 36' between the divided bases 32', each the divided annular bodies 36' made of magnetic material.

The divided elements 30' thus formed are arranged around the rotary shaft 20 and fixed, thereby forming the rotor iron-cores 30A and 30B. Means for fixing the divided elements 30' is not particularly limited. For example, it is preferable to form respective grooves into which the inner periphery portions 96 of the unit plates 90 are inserted, on the outer circumferential surface of the rotary shaft 20 (that is, the outer circumferential surface of the magnetic cylinder body 24 in the figure). Besides, between the divided elements 30' circumferentially adjacent to each other, preferably are interposed respective spacers each made of non-magnetic material. The spacers can also be formed, for example, integrally with respective pressing jigs 26 attached to opposite end portions of the rotary shaft 20 or the inner spacer 81.

As explained above, according to the present invention, there is provided a so-called Lundell-type generator capable of avoiding generation of an eddy current in rotor iron-cores with no complicated structure. The generator includes: a stator including a plurality of stator iron-cores including respective stator magnetic poles and arrayed circumferentially to surround a space inside thereof and a stator coil wound around each of the stator iron-cores; a rotary shaft disposed on an inner side of the stator so as to be rotatable relatively to the stator and including a magnetic outer periphery portion made of magnetic material in at least an axial part of a region of the rotary shaft; a first rotor iron-core and a second rotor iron-core disposed around the magnetic outer periphery portion so as to rotate together with the rotary shaft on the inner side of the stator, each of the rotor iron-cores including a base disposed around the magnetic outer periphery portion and a plurality of rotor magnetic-pole portions extending axially of the rotary shaft from a plurality of positions arrayed circumferentially of the base in an outer periphery of the base and opposed to the stator magnetic poles to be able to be magnetically coupled to the stator magnetic poles, the rotor magnetic-pole portions of the first rotor iron-core and the rotor magnetic-pole portions of the second rotor iron-core being disposed so as to be alternately arrayed in a rotationally circumferential direction; and a rotor coil provided on radially inner sides of the rotor magnetic-pole portions of the first and second rotor iron-cores to generate magnetic fluxes in the rotor iron-cores and the stator iron-cores. Each of the first and second rotor iron-cores is formed of a plurality of unit plates stacked axially of the rotary shaft, the unit plates being electrically insulated from each other. Each of the unit plates is formed of a single thin plate made of magnetic material and includes a basal plate portion having a through-hole in a center thereof and disposed around the magnetic outer periphery portion of the rotary shaft in a state where the rotary shaft is inserted through the through-hole and a plurality of magnetic-pole plate portions extending axially of the rotary shaft from a plurality of positions arranged circumferentially of the basal plate portion, the plurality of magnetic-pole plate portions slanting radially outward. The basal plate portions are stacked axially to form the respective bases of the first and second rotor iron-cores. The magnetic-pole plate portions are stacked axially to form the respective rotor magnetic-pole portions of the first and second rotor iron-cores.

In the generator, where the first and second rotor iron-cores are formed of the plurality of unit plates stacked mutually and axially, eddy current is effectively restrained from being generated in the rotor iron-cores, compared with a conventional generator where each of rotor iron-cores is formed of a single iron lump. Moreover, since each of the unit plates is formed of a single thin plate made of the magnetic material so as to integrally include the basal plate portion and the plurality of magnetic-pole plate portion and the basal plate portions and the magnetic-pole plate portions are stacked axially, respectively, to thereby respectively form the bases and the rotor magnetic-pole portions of the first and second rotor iron-cores, respectively, the rotor iron-cores having an excellent eddy current prevention characteristic can be constructed without requiring a complicated fastening structure or a large number of components for assembly.

Furthermore, in the present invention, each of the unit plates can have the same shape, which allows production efficiency of the rotor iron-cores to be remarkably improved.

Besides, in the generator, the axial stack of the unit plates can make respective distal ends of the magnetic-pole plate portions of the unit plates be arranged so as to be arrayed along stator magnetic pole surfaces which are respective inner side surfaces of the stator magnetic poles to thereby form rotor magnetic pole surfaces opposed to the stator magnetic pole surfaces. Such rotor magnetic pole surfaces effectively restrain eddy current from being generated while permitting magnetic fluxes to make smooth entrance from the stator magnetic pole surfaces.

Furthermore, if the distal ends of the magnetic-pole plate portions form a brim-shaped portion projecting radially outward toward the stator magnetic pole surfaces, a flow of a magnetic flux is further smoothed.

On the other hand, it is more desirable that a part of the basal plate portion of each of the unit plates, the part surrounding the through-hole, forms an inner periphery portion extending toward the same side as the magnetic-pole plate portions and slanting radially inward, the inner periphery portions being stacked mutually and axially. The stack of the inner periphery portions allows the stacking state of the unit plates to be more stable. Besides, the slant of each of the inner periphery portions can increase an opposition area of the periphery portions and the rotary shaft compared with the case where the periphery portions are orthogonal to the rotary shaft, thereby allowing magnetic resistance to be reduced.

Furthermore, in this case, if a diameter of the distal end of each of the inner periphery portions is set such that the distal end of each of the inner periphery portions is brought into close contact with the outer circumferential surface of the magnetic outer periphery portion of the rotary shaft, magnetic resistance between the inner periphery portions and the magnetic outer periphery portion can be further reduced and respective relative positions of the first and second rotor iron-cores to the rotary shaft can be stabilized.

Each of the unit plates according to the present invention can be easily formed by bending (e.g., press-forging) a single flat plate made of magnetic material and including the basal plate portion and the magnetic-pole plate portions.

In order to exhibit excellent magnetic characteristics, the unit plates are desirably magnetically annealed. Specifically, each of the unit plates is suitably a thin iron plate having a metal microstructure of a ferrite single phase and annealed at 850° C. or more to make an average crystal grain diameter to 100 μm or more.

In each of the unit plates, at least one of both side surfaces and an end face of each of the unit plate is desirably covered with an insulating coating. Specific material of the unit plates is desirably a material having satisfactory magnetic characteristics, specifically, pure iron or an iron alloy whose magnetic flux density in an excitation magnetic field of 10000 A/m is 1.5 T or more. For example, an iron-based material including component compositions (excluding an insulating coating) satisfying any one of the following conditions is suitable.

A. Respective concentrations of C, P, S, and Al, which are impurity elements harmful for the magnetic characteristics, are as follows: C: 0.03% or less; P: 0.03% or less; S: 0.03%; and Al: 0.03% or less. The remainder consists of iron and inevitable impurities.

B. Respective concentrations of C, P, S, and Al, which are the impurity elements harmful for the magnetic characteristics, are as follows: C: 0.03% or less; P: 0.03% or less; S: 0.03%; and Al: 0.03% or less. Concentration of Mn is 0.10 to 0.50, and the remainder consists of iron and inevitable impurities.

C. Respective concentrations of C, P, S, and Al, which are the impurity elements harmful for the magnetic characteristics, are as follows: C: 0.03% or less; P: 0.03% or less; S: 0.03%; and Al: 0.03% or less. Concentration of Mn is 0.10 to 0.50%, concentration of Si is 0.05 to 2.0%, and the remainder has a component composition consisting of iron and inevitable impurities.

The thickness of the unit plates is desirably a value equal to or smaller than a skin depth value corresponding to a magnetic frequency and material quality (conductivity and magnetic permeability) of the rotor iron-cores, the magnetic frequency being obtained by multiplying a rotation frequency (a rated rotation frequency) of the generator with the number of the rotor magnetic-pole portions of the rotor iron-cores, and equal to or larger than a skin depth value corresponding to a frequency ten times higher than the magnetic pole frequency. The stack of the unit plates each having such small thickness restrains eddy current from being generated more effectively.

The rotary shaft suitably includes, for example, a main shaft and a magnetic cylinder body made of magnetic material and disposed around the main shaft at least in an axial part of a region of the main shaft to form the magnetic outer periphery portion.

The generator according to the present invention suitably further includes an outer spacer and an inner spacer which are made of nonmagnetic insulating material, the outer spacer being interposed between respective rotor magnetic-pole portions of the rotor iron-cores and the rotor coil, the inner spacer being interposed between the rotor coil and the rotary shaft. The spacers can stabilize respective relative positions of the rotor coil and the rotor magnetic-pole portions to the rotary shaft.

In this case, the generator according to the present invention desirably further includes an annular constraint member attached across the magnetic-pole plate portions of at least an outer unit plate which is a plate located on the axially outermost side among the unit plates forming the rotor iron-cores, so as to prevent the magnetic-pole plate portions from spreading radially outward by a centrifugal force. The constraint member can effectively restrain, with a simple structure, the magnetic-pole plate portions from deformation due to a centrifugal force.

Each of the rotor iron-cores desirably further includes a magnetic annular element made of magnetic material and interposed between the basal plate portions of the unit plates adjacent to one another. The interposition of the magnetic annular element makes it possible to reduce magnetic resistance in the rotor iron-cores by effective utilization of axial gaps formed between the basal plate portions involved by the stack of the unit plates.

In the present invention, the base of each of the first and second rotor iron-cores has a structure divided circumferentially for the respective rotor magnetic-pole portions. Specifically, each of the rotor iron-cores may include a plurality of divided bases disposed around the magnetic outer periphery portion so as to be arranged circumferentially, and a plurality of rotor magnetic-pole portions extending axially of the rotary shaft from respective outer end portions of the bases and opposed to the stator magnetic poles to be capable of being magnetically coupled to the stator magnetic poles. Also in this case, each of the first and second rotor iron-cores can be formed of a plurality of unit plates each formed of a single thin plate made of magnetic material, the plurality of unit plates being stacked while being electrically insulated from each other. Each of the unit plates in this case may integrally include a divided basal plate portion disposed around the magnetic outer periphery portion of the rotary shaft and a magnetic-pole plate portion extending axially of the rotary shaft and slanting radially outward from respective outer end portions of the divided basal plate portions, the divided basal plate portions being stacked axially to thereby form the respective divided bases of the first and second rotor iron-cores, the magnetic-pole plate portions being stacked axially to thereby the respective rotor magnetic-pole portions of the first and second rotor iron-cores.

The invention claimed is:

1. A generator comprising:
   a stator including a plurality of stator iron-cores including respective stator magnetic poles and arrayed circumferentially to surround a space inside thereof and a stator coil wound around each of the stator iron-cores;
   a rotary shaft disposed on the inner side of the stator so as to be rotatable relatively to the stator, the rotary shaft including a magnetic outer periphery portion made of magnetic material in at least an axial part of a region of the rotary shaft;
   a first rotor iron-core and a second rotor iron-core disposed around the magnetic outer periphery portion so as to rotate together with the rotary shaft on the inner side of the stator, each of the first rotor iron-core and the second rotor iron-core including a base disposed around the magnetic outer periphery portion and a plurality of rotor magnetic-pole portions extending axially of the rotary shaft from a plurality of positions arrayed circumferentially of the base in an outer periphery of the base and opposed to the stator magnetic poles to be able to be magnetically coupled to the stator magnetic poles, the rotor magnetic-pole portions of the first rotor iron-core and the rotor magnetic-pole portions of the second rotor iron-core being disposed so as to be alternately array in a rotationally circumferential direction; and
   a rotor coil provided on a radially inner side of each of the rotor magnetic-pole portions of the first and second rotor iron-cores to generate magnetic fluxes in the rotor iron-cores and the stator iron-cores,
   wherein each of the first and second rotor iron-cores is formed of a plurality of unit plates stacked axially of the rotary shaft, the unit plates being electrically insulated from each other; each of the unit plates is formed of a single thin plate made of magnetic material and includes a basal plate portion having a through-hole in a center thereof and disposed around the magnetic outer periphery portion of the rotary shaft in a state where the rotary shaft is inserted through the through-hole and a plurality of magnetic-pole plate portions extending axially of the rotary shaft from a plurality of positions arranged circumferentially of the basal plate portion in an outer periphery of the basal plate portion, the plurality of magnetic-pole plate portions slanting radially outward; the basal plate portions are stacked axially to form the respective bases of the first and second rotor iron-cores; and the magnetic-pole plate portions are stacked axially to form the respective rotor magnetic-pole portions of the first and second rotor iron-cores,
   the axial stack of the unit plates makes respective distal ends of the magnetic-pole plate portions of the unit plates be arranged so as to be arrayed along stator magnetic pole surfaces which are respective inner side surfaces of the stator magnetic poles and thereby form rotor magnetic pole surfaces opposed to the stator magnetic pole surfaces, and
   the distal ends of the magnetic-pole plate portions form a brim-shaped portion projecting radially outward toward the stator magnetic pole surfaces.

2. The generator according to claim 1, wherein each of the unit plates has a same shape.

3. The generator according to claim 1, wherein each of the unit plates is formed by bending a single flat plate made of magnetic material, the flat plate including the basal plate portion and the magnetic-pole plate portions.

4. The generator according to claim 1, wherein the unit plates are magnetically annealed.

5. The generator according to claim 1, wherein at least one of both side surfaces and an end face of each of the unit plates are covered with an insulating coating.

6. The generator according to claim 1, wherein the thickness of the unit plates is a value equal to or smaller than a skin depth value corresponding to a magnetic frequency and material quality of the rotor iron-cores, the magnetic frequency being obtained by multiplying a rotation frequency of the generator with the number of the rotor magnetic-pole portions of the rotor iron-cores, and equal to or larger than a skin depth value corresponding to a frequency ten times higher than the magnetic pole frequency.

7. The generator according to claim 1, wherein the rotary shaft includes a main shaft and a magnetic cylinder body made of magnetic material and disposed around the main shaft in at least an axial part of a region of the main shaft to form the magnetic outer periphery portion.

8. The generator according to claim 1, further comprising an outer spacer and an inner spacer which are made of nonmagnetic insulating material, wherein the outer spacer is interposed between the rotor magnetic-pole portions of the rotor iron-cores and the rotor coil and the inner spacer is interposed between the rotor coil and the rotary shaft.

9. The generator according to claim 8, further comprising an annular constraint member attached across the magnetic-pole plate portions of at least an outer unit plate which is a plate located on an axially outermost side among the unit plates forming the rotor iron-cores, so as to prevent the magnetic-pole plate portions from spreading radially outward by a centrifugal force.

10. The generator according to claim 1, wherein each of the rotor iron-cores further includes a plurality of magnetic annular elements made of magnetic material and interposed between the basal plate portions of the unit plates adjacent to each other.

11. A generator comprising:
a stator including a plurality of stator iron-cores including respective stator magnetic poles and arrayed circumferentially to surround a space inside thereof and a stator coil wound around each of the stator iron-cores;
a rotary shaft disposed on the inner side of the stator so as to be rotatable relatively to the stator, the rotary shaft including a magnetic outer periphery portion made of magnetic material in at least an axial part of a region of the rotary shaft;
a first rotor iron-core and a second rotor iron-core disposed around the magnetic outer periphery portion so as to rotate together with the rotary shaft on the inner side of the stator, each of the first rotor iron-core and the second rotor iron-core including a base disposed around the magnetic outer periphery portion and a plurality of rotor magnetic-pole portions extending axially of the rotary shaft from a plurality of positions arrayed circumferentially of the base in an outer periphery of the base and opposed to the stator magnetic poles to be able to be magnetically coupled to the stator magnetic poles, the rotor magnetic-pole portions of the first rotor iron-core and the rotor magnetic-pole portions of the second rotor iron-core being disposed so as to be alternately array in a rotationally circumferential direction; and
a rotor coil provided on a radially inner side of each of the rotor magnetic-pole portions of the first and second rotor iron-cores to generate magnetic fluxes in the rotor iron-cores and the stator iron-cores,
wherein each of the first and second rotor iron-cores is formed of a plurality of unit plates stacked axially of the rotary shaft, the unit plates being electrically insulated from each other; each of the unit plates is formed of a single thin plate made of magnetic material and includes a basal plate portion having a through-hole in a center thereof and disposed around the magnetic outer periphery portion of the rotary shaft in a state where the rotary shaft is inserted through the through-hole and a plurality of magnetic-pole plate portions extending axially of the rotary shaft from a plurality of positions arranged circumferentially of the basal plate portion in an outer periphery of the basal plate portion, the plurality of magnetic-pole plate portions slanting radially outward; the basal plate portions are stacked axially to form the respective bases of the first and second rotor iron-cores; and the magnetic-pole plate portions are stacked axially to form the respective rotor magnetic-pole portions of the first and second rotor iron-cores; and
a part of the basal plate portion of each of the unit plates, the part surrounding the through-hole, forms an inner periphery portion extending toward the same side as the magnetic-pole plate portions and slanting radially inward, the inner periphery portions being stacked mutually and axially.

12. The generator according to claim 11, wherein a diameter of a distal end of each of the inner periphery portions is set such that the distal end of each of the inner periphery portions is brought into close contact with an outer circumferential surface of the magnetic outer periphery portion of the rotary shaft.

13. A generator comprising:
a stator including a plurality of stator iron-cores including respective stator magnetic poles and arrayed circumferentially to surround a space inside thereof and a stator coil wound around each of the stator iron-cores;
a rotary shaft disposed on the inner side of the stator so as to be rotatable relatively to the stator, the rotary shaft including a magnetic outer periphery portion made of magnetic material in at least an axial part of a region of the rotary shaft;
a first rotor iron-core and a second rotor iron-core disposed around the magnetic outer periphery portion so as to rotate together with the rotary shaft on the inner side of the stator, each of the first rotor iron-core and the second rotor iron-core including a plurality of divided bases disposed around the magnetic outer periphery portion to be arranged circumferentially and a plurality of rotor magnetic-pole portions extending axially of the rotary shaft from respective outer end portions of the bases and opposed to the stator magnetic poles to be capable of being magnetically coupled to the stator magnetic poles, the rotor magnetic-pole portions of the first rotor iron-core and the rotor magnetic-pole portions of the second rotor iron-core being disposed so as to be alternately array in a rotationally circumferential direction; and
a rotor coil provided on a radially inner side of each of the rotor magnetic-pole portions of the first and second rotor iron-cores to generate magnetic fluxes in the rotor iron-cores and the stator iron-cores,
wherein each of the first and second rotor iron-cores is formed of a plurality of unit plates axially of the rotary shaft while being electrically insulated from each other; each of the unit plates is formed of a single thin plate made of magnetic material and integrally includes a divided basal plate portion disposed around the magnetic outer periphery portion of the rotary shaft and a magnetic-pole plate portion extending axially of the rotary shaft and slanting radially outward from respective outer end portions of the divided basal plate portions; the divided basal plate portions are stacked axially and thereby form the respective divided bases of the first and second rotor iron-cores; and the magnetic-pole plate portions are stacked axially and thereby form the respective rotor magnetic-pole portions of the first and second rotor iron-cores.

* * * * *